(12) United States Patent
Kim et al.

(10) Patent No.: US 10,121,118 B1
(45) Date of Patent: Nov. 6, 2018

(54) CONFIRMING DELIVERY OF MULTIPLE PACKAGES TO A DELIVERY LOCATION USING PACKAGE TAGS

(71) Applicant: Amazon Technologies, Inc., Seattle, WA (US)

(72) Inventors: Jin Dong Kim, Cupertino, CA (US); Sang Eun Lee, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 315 days.

(21) Appl. No.: 14/707,217

(22) Filed: May 8, 2015

(51) Int. Cl.
*G06Q 30/00* (2012.01)
*G06Q 10/08* (2012.01)
*H04W 4/80* (2018.01)

(52) U.S. Cl.
CPC ....... *G06Q 10/0833* (2013.01); *G06Q 10/083* (2013.01); *G06Q 10/0832* (2013.01); *H04W 4/80* (2018.02)

(58) Field of Classification Search
CPC .................. G06Q 10/083; G06Q 10/0832
See application file for complete search history.

(56) References Cited

U.S. PATENT DOCUMENTS

| | | | | |
|---|---|---|---|---|
| 6,988,079 B1* | 1/2006 | Or-Bach | ................ | G06Q 10/08 340/10.1 |
| 7,809,377 B1* | 10/2010 | Lau | ....................... | G06Q 10/00 340/539.13 |
| 7,831,524 B2* | 11/2010 | Whitehouse | ....... | G06Q 10/0833 705/333 |
| 8,065,237 B2* | 11/2011 | Bennett | .................. | G06Q 10/08 705/330 |
| 8,301,158 B1* | 10/2012 | Thomas | .................. | H04W 4/02 340/539.13 |
| 2003/0171948 A1* | 9/2003 | Thomas | ................. | G06Q 10/08 705/331 |
| 2004/0233065 A1* | 11/2004 | Freeman | ............ | G06K 7/10079 340/8.1 |
| 2006/0091205 A1* | 5/2006 | Agrawal | .......... | H04M 3/42263 235/382 |
| 2007/0047459 A1* | 3/2007 | Kadaba | ................ | G06Q 10/087 370/252 |

(Continued)

FOREIGN PATENT DOCUMENTS

GB 2523892 A * 9/2015 ............. G06Q 10/08

*Primary Examiner* — Ramsey Refai
(74) *Attorney, Agent, or Firm* — K&L Gates LLP

(57) ABSTRACT

A method of managing delivery of a group of packages to a customer delivery address. A radio transceiver establishes a communication link between a tag and a computing device. The tag is associated with a package, the package being among a group of packages to be delivered to the customer delivery address. A radio signal is received at the computing device over the link. The radio signal is representative of tracking information associated with the package, the tracking information includes a unique package code and a unique group identification code. The signal strength of the radio signal is determined. The computing device determines that the package associated with the tag belongs with the group of packages based at least in part on proximity of the tag relative to the computing device and a unique group identification code associated with the customer delivery address.

21 Claims, 11 Drawing Sheets

(56) References Cited

U.S. PATENT DOCUMENTS

| | | | |
|---|---|---|---|
| 2007/0188324 A1* | 8/2007 | Bailin | G06Q 10/08 340/572.1 |
| 2008/0047329 A1* | 2/2008 | Breed | G01N 35/00871 73/61.41 |
| 2008/0088441 A1* | 4/2008 | Breed | B60C 11/24 340/539.26 |
| 2008/0108372 A1* | 5/2008 | Breed | G01M 5/0008 455/456.1 |
| 2009/0143923 A1* | 6/2009 | Breed | G08G 1/205 701/1 |

* cited by examiner

| Radio Tag ID Code | Group Sub-ID Code | Package | Item Description | Delivery Location |
| --- | --- | --- | --- | --- |
| 00001 | 001 | P1-1 | Laptop Computer | John Doe, 123 Bear Lane, Coffeeville, WA |
| 00002 | 001 | P2-1 | Smart Phone | John Doe, 123 Bear Lane, Coffeeville, WA |
| 00003 | 001 | P3-1 | Coffee Maker | John Doe, 123 Bear Lane, Coffeeville, WA |
| 00004 | 001 | P4-1 | Microwave Oven | John Doe, 123 Bear Lane, Coffeeville, WA |
| 00005 | 001 | P5-1 | Wireless Router | John Doe, 123 Bear Lane, Coffeeville, WA |
| 00001 | 002 | P1-2 | Purse | Jane Roe, 456 Shady Pine Drive, Bayside, WA |
| 00002 | 002 | P2-2 | Espresso Machine | Jane Roe, 456 Shady Pine Drive, Bayside, WA |
| 00003 | 002 | P3-2 | Fitness Watch | Jane Roe, 456 Shady Pine Drive, Bayside, WA |
| 00004 | 002 | P4-2 | Blender | Jane Roe, 456 Shady Pine Drive, Bayside, WA |

FIG. 6

CONFIRMING DELIVERY OF MULTIPLE PACKAGES TO A DELIVERY LOCATION USING PACKAGE TAGS

BACKGROUND

While delivering multiple packages to a customer's residence, there exists the possibility of mixing up packages or omitting a package that could cause customer dissatisfaction and increase delivery costs.

Accordingly, there is a need for improved systems and methods to facilitate identifying when a package is incorrectly included or omitted in a group of multiple packages being delivered to a customer address.

BRIEF DESCRIPTION OF DRAWINGS

FIG. 6 is a fulfillment table illustrating package descriptions and associated delivery group in accordance with some embodiments.

DETAILED DESCRIPTION

Figure 1:
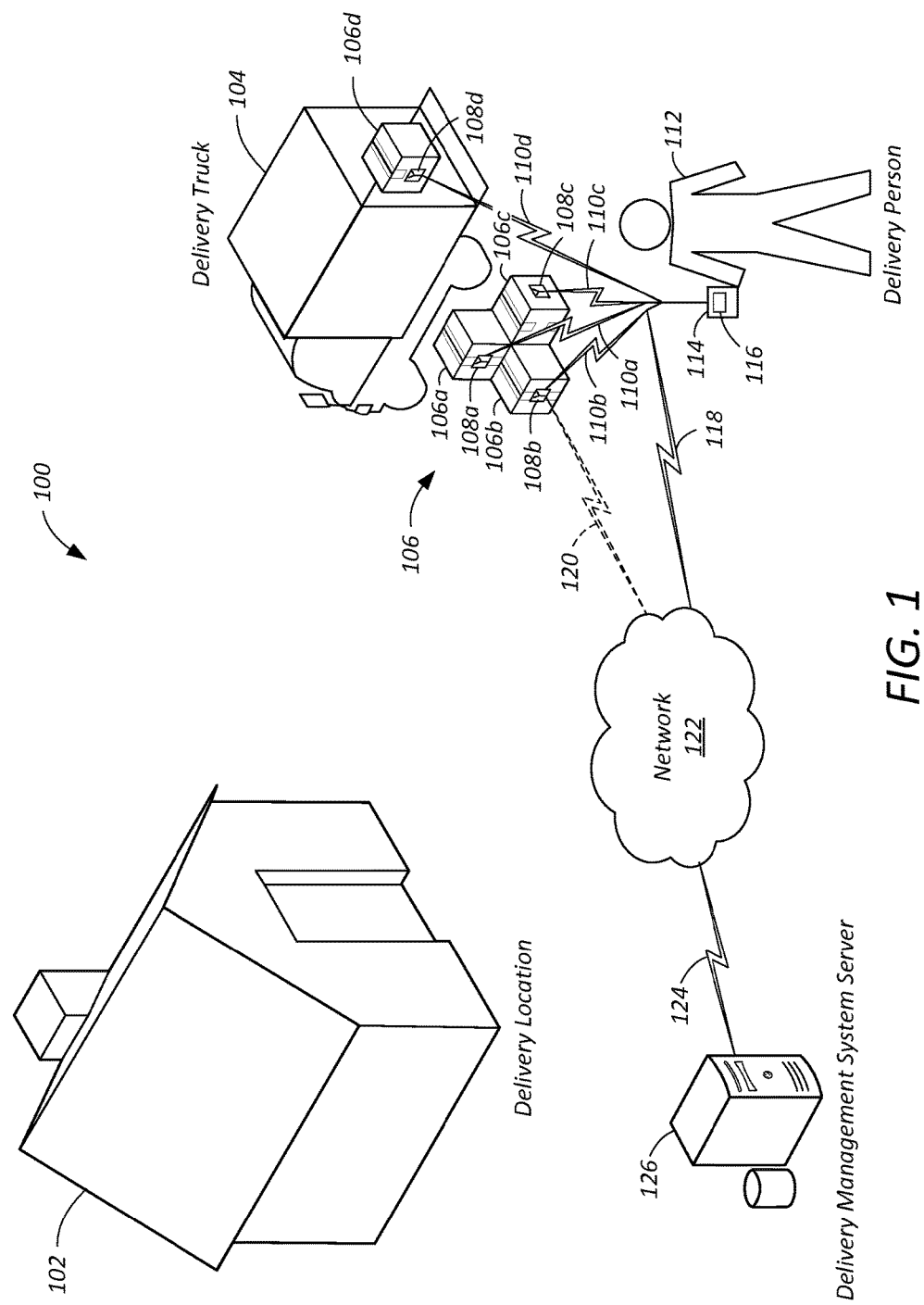
FIG. 1 is a diagram illustrating an example environment in which embodiments of a system for confirming delivery of multiple packages using radio tags.

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

In one embodiment, the present disclosure provides a system and method of confirming delivery of multiple packages grouped together for delivery to a single customer. Some embodiments of the present disclosure employ package tags to prevent or minimize the possibility of errors occurring by grouping or bundling an incorrect package or omitting a package from a group of packages being delivered to a customer location. In one embodiment, a low cost disposable tag may be applied to each package. The tag stores data representing a package and group tracking information comprising a package identification (ID) code and a group sub-ID code describing the packages to be delivered to one customer or to one delivery location. In use, as a delivery truck approaches the residence of a customer, the package tags emit radio frequency (RF) signals that are received either by a computing device such as a package tracking device equipped with an RF receiver or a computing device such as a delivery management system server remotely located from the delivery site. The package tracking device or the delivery management system server are configured to send out an alert signal upon detecting that the incorrect package was included in a group of packages being delivered to a residence by the delivery person or upon detecting a missing package in the group. As used herein, a package tracking device may be referred to as a delivery person computing device or may refer to a remote backend server such as a delivery management system server.

Several techniques may be employed to detect and identify an incorrect package and/or missing package being delivered to the customer residence. One technique employs detecting the signal strength of the radio signal transmitted by the tag with a receiver signal strength indicator (RSSI) located in a package tracking device. The received signal strength of the radio signal transmitted by a package tags is compared either to a minimum threshold or to a relative threshold to determine the proximity of the package tag to the tracking device. The RSSI technique exploits the fact that the signal strength received by the package tracking device varies over the distance between the package tag and a delivery person computing device. The identification of incorrectly included packages or omitted packages in a group of packages may be performed at the delivery person computing device or at a remotely located delivery management system server.

Another technique employs fixed radio networks to receive a radio signal from the package tag and determining the location of the package tag using the radio towers in a wide area network. Such techniques are commonly known as multilateration or triangulation. The information from the package tag is communicated to a backend server such as a delivery management system server over wireless wide area networks, e.g., the cloud, deploying groups of remote servers and software networks that allow centralized data storage and online access to computer services or resources to identify incorrect and/or missing packages in the group. The embodiments, however, should not be limited in this respect. Other techniques and/or various combinations of the disclosed techniques may be implemented without departing from the overall scope of the present disclosure.

FIG. 1 is a diagram illustrating an example environment 100 in which embodiments of a system confirming delivery of a group of associated packages 106 using radio tags 180a, 108b, 108c,108d affixed to the packages 106a, 106b, 106c, 106d. In a typical scenario, when a customer orders multiple items from an electronic commerce company or Internet-based retailer, the items may be shipped to the customer from a fulfillment center of the electronic commerce company via one or multiple packages. When items to be shipped to a single customer are packed in multiple packages 106, the fulfillment center applies a radio tag 108a-108d to the individual packages 106a-106d. The radio tags 108a-108d are programmed with a Package ID code that identifies the individual packages 106a-106d as well as a Group Sub-ID code that identifies the package group 106 that the individual packages 106a-106d are associated with. In one embodiment, individual packages 106a-106d may be associated with a package group 106 based on a common or single delivery location 102. The group of individual packages 106a-106n are associated with a package group 106 by programming the radio tags 108a-108d with the Package ID and Group Sub-ID codes at the fulfillment center. Other criteria besides a common or single delivery location 102 may be employed to associate the individual packages and thus the scope of the present disclosure should not be limited in this respect. A fulfillment table is generated which includes the tracking information, such as the Package ID code and Group Sub-ID code, and the delivery location 102 such that the Package ID and Group Sub-ID codes are associated with a unique delivery location 102. The coordinates of the delivery location may be readily determined based on global positioning system (GPS) maps.

As shown in FIG. 1, the delivery person 112 is shown in the process of delivering multiple packages 106a-106c to the home 102 of a customer. During the delivery process, the delivery person may not be aware that a package 106d belongs to package group 106 has been left in the delivery truck 104. Alternatively, the delivery person may not be aware that one of the other packages 106a-106c selected for delivery may not belong with the group of packages to be delivered to the home 102. Accordingly, in one embodiment, each package 106a-106d is equipped with a corresponding radio tag 180a-108d programmed at the fulfillment center with a Package ID code that identifies the individual package 106a-106d and a Group Sub-ID code that identifies the package group 106 associated with the individual packages 106a-106d to be delivered to the delivery location. In various embodiments, the radio tags 108a-108d transmit the Package ID/Group Sub-ID codes via corresponding radio signals 110a, 110b, 110c, 110d to a transceiver 116 located in the hand held computing device, such as a package tracking device carried by the delivery person 112, referred to herein as a delivery person computing device 114.

As illustrated in FIG. 1, for example, by virtue of their location within a predetermined distance d (e.g., ~3 ft. radius) or predetermined area A (~9 ft.²) to the delivery person computing device 114, the radio signals 110a-110c received by delivery person computing device 114 can be employed to determine an estimated distance from the delivery person computing device 114 based on the signal strength of the radio signal received by the delivery person computing device 114. The radio signal strength of the radio signal 110d transmitted by the radio tag 108d corresponding to a package 106d left inside the delivery truck 104, however, may be weaker due to its location being further away from the delivery person computing device 114 either absolutely or relative to the other packages 106a-106c. Accordingly, the strength of the radio signal 110d received by the delivery person computing device 114 may be such that the delivery person computing device 114 either does not recognize the package 108d or considers it to be too far away from the other packages 106a-106c to include in the package group 106 selected for delivery. Alternatively, other relative signal strength techniques may be employed to determine an incorrect or omitted package associated with the package group 106.

A module within the delivery person computing device 114 can determine whether the radio tags 108a-108d are located within the predetermined distance based on the RSSI estimated distances. The delivery person computing device 114 may include a database that stores the fulfillment table including the tracking information, comprising the Package ID codes and Group Sub-ID codes, and the associated delivery locations. The delivery person computing device 114 correlates the package Group Sub-ID codes for the packages 106a-106d located within the predetermined distance d to the known delivery address location 102. Thus, the delivery person computing device 114 can recognize whether the packages 106a-106d for the delivery location 102 have been properly selected. Thus, based on the Group Sub-ID portion of the tracking information and the delivery location, the delivery person computing device 114 can determine whether the selected group of packages 106a-106 includes an incorrect package 106c or whether any of the packages 108a-108c were properly selected for delivery to the delivery location 102 or whether a package 106d was omitted from the selected group of packages 106 to be delivered to the delivery location 102. Upon determining any discrepancy, the delivery person computing device 114 notifies the delivery person 112 using audible, visual or, tactile feedback, or a combination thereof.

Alternatively, in addition to the configuration described above, the delivery person computing device 114 may be configured to communicate with a delivery management system server 126 over a wide area network 122 by way of a wireless communication channel 118 or link. The delivery management system server 126 is configured communicate with the network 122 over a wired or wireless communication channel 124. In such embodiment, the database is located remotely. The remotely located database stores the fulfillment table including the tracking information, comprising the Package ID codes, Group Sub-ID codes, and associated delivery location. Thus, the delivery management system server 126 determines whether any of the packages 106a-106c were incorrectly selected for delivery or whether a package 106d has been omitted from the delivery package group 106. In other embodiments, the radio tags 108a-108d may communicate the Package ID/Group Sub-ID codes to a base station or other radio network over a long range radio signal 120 and subsequently over the wide area network 122 to the delivery management system server 126. Each of these embodiments will be described with greater detail hereinbelow in connection with FIGS. 2 and 3, for example.

The network 122 may include, for example, the Internet, intranets, extranets, wide area networks (WANs), local area networks (LANs), wired networks, wireless networks, or other suitable networks, etc., or any combination of two or more such networks.

Figure 2:
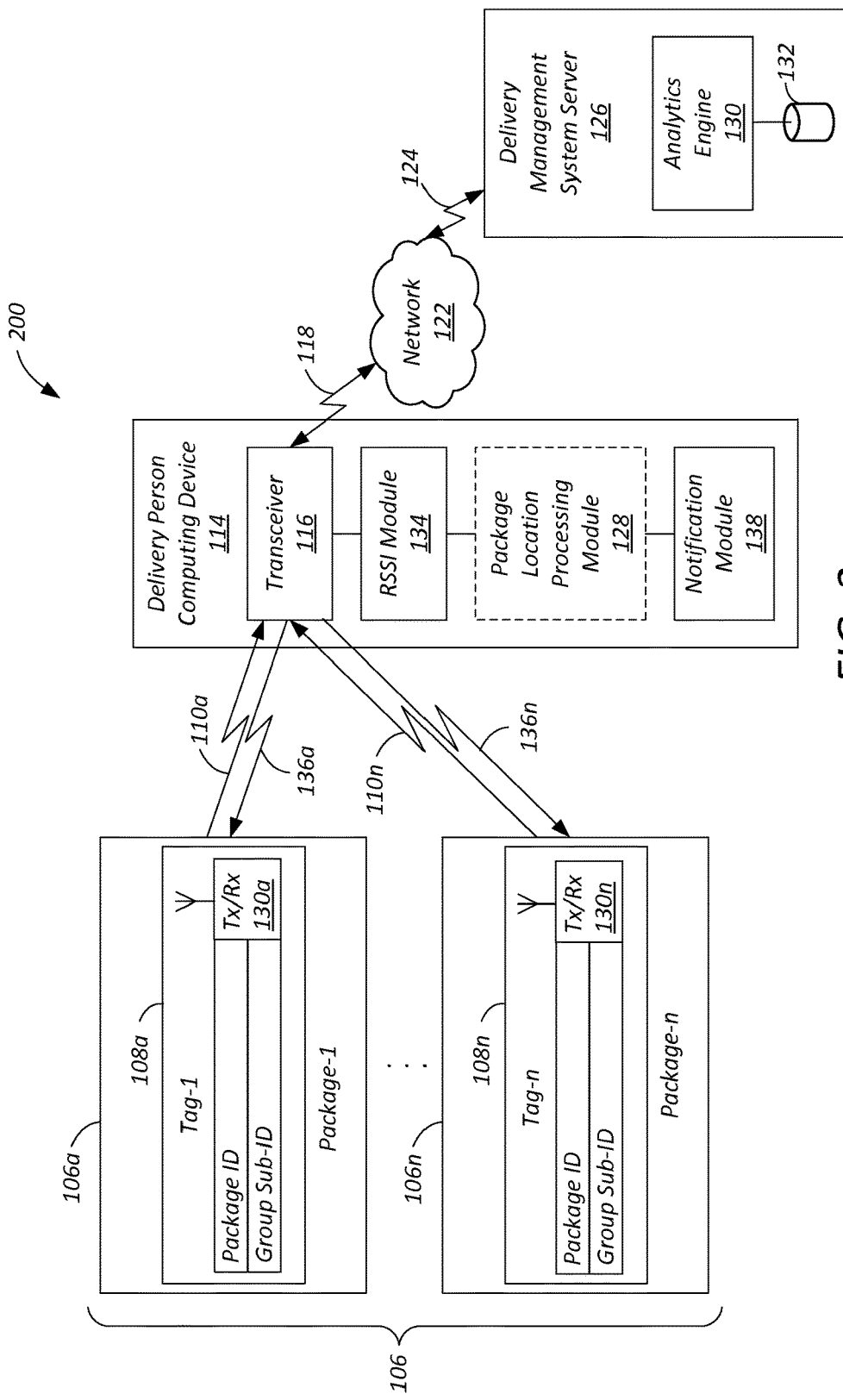
FIG. 2 is a diagram illustrating one embodiment of a system for confirming delivery of multiple packages using radio tags employing receiver signal strength indicator (RSSI) techniques.

FIG. 2 is a diagram illustrating one embodiment of a system 200 for confirming delivery of multiple packages 106 using radio tags 108a-108n employing RSSI techniques. In one embodiment, each of the radio tags 108a-108n comprise a corresponding radio transmitter 130a-130n. In one embodiment, the radio transmitters 130a-130n may be configured as beacons that periodically or randomly transmit the Package ID/Group Sub-ID codes via corresponding radio signals 110a-110n to the transceiver 116 located in the hand held delivery person computing device 114. In other embodiments, the radio transmitters 130a-130n may be configured to transmit the Package ID/Group Sub-ID codes at a variable frequency such that they transmit less frequently when the radio tags 108a-108n are further away from the delivery location and to transmit the Package ID/Group Sub-ID codes as the radio tags 108a-108n approach the delivery location. In other embodiments, the radio transmitters 130a-130n communicate the Package ID/Group Sub-ID codes via corresponding radio signals 110a-110n to the transceiver 116 upon receiving an interrogation signal 136a-136n from the delivery person computing device 114 transceiver 116.

The periodic or cyclic transmissions by the radio tags 108a-108n may occur at a fixed predetermined rate or may occur at a variable rate such that the radio tags 108a-108n transmit more frequently as the radio tags 108a-108n get closer to the customer's home 102 (FIG. 1). In this manner, much finer analytics of the package movement can be performed. As an example, when the package is more than 1,000 feet away from the delivery location the transmission rate may be much lower than the transmission rate as the packages approach the delivery location. For example, when the packages are near the delivery location, the transmission may be about once per minute. In another embodiment, the radio tags 108a-108n may be configured or programmed to transmit only when they are at a certain distance from the central computational source, e.g., the delivery management system server 126, to inform the computational source where the radio tags 108a-108n are located when the transmissions occur.

The delivery person computing device 114 includes an RSSI module 134 configured to monitor the receiver signal strength and to measure the power present in the radio signals 110a-110n received by the transceiver 116. The RSSI values may be compared to a predetermined threshold or may be compared relative to other RSSI values to determine the proximity of the radio tags 108a-108n relative to the delivery person computing device 114 or relative to other packages. The RSSI technique exploits the variable signal strength received by the transceiver 116 based on the distance between the radio tags 108a-108n and the delivery person computing device 114. As previously discussed, the identification of incorrectly included or omitted packages may be performed locally at the delivery person computing device 114, remotely at the delivery management system server 126, or a combination thereof.

The RSSI module may be configured to execute a variety of RSSI-based algorithms to determine the coordinates of the location of the packages 106. Some algorithms simply determine an estimated distance form the delivery person computing device 114 to the packages 106. Other, more sophisticated algorithms employ fingerprinting or propagation channel modeling positioning techniques. These algorithms include, without limitation RSSI fingerprinting-based positioning algorithms, K-Nearest Neighbors (KNN) algorithms, compressive sensing-based algorithms, while other algorithms may employ inertial sensors, maps, and mobility models for tracking the location of the packages 106 relative to a known position such as the GPS coordinates of the delivery person computing device 114 or the GPS coordinates of the delivery location 102 (FIG. 1).

In one embodiment, the delivery person computing device 114 optionally comprises a package location processing module 128 to process the RSSI distance estimates or package coordinates locally. Upon receiving the Package ID/Group Sub-ID codes of the packages 106a-106n from the radio tags 108a-108n and measuring the strength of the corresponding radio signals 110a-110n, the package location processing module 128 determines the distance estimates from the delivery person computing device 114 to the packages 106 based on either the RSSI distance estimates or the package coordinates data. Once the estimated distances between the delivery person computing device 114 and the packages 106 is determined, the package location processing module 128 checks the delivery of the packages 106a-106d locally using a lookup table and statistical techniques, as explained in more detail hereinbelow. The package location processing module 128 is configured with the necessary circuitry and processing devices to compare the strengths of the received signals 110a-110n either to an absolute threshold or a relative threshold to confirm whether the package group 106 to be delivered to the customer's home 102 includes an incorrect package, a missing package, or both.

In one embodiment, for example, the package location processing module 128 determines the estimated distances to all the packages associated with the delivery location 102 (FIG. 1) identified by the Group Sub-ID code. Once the estimated distances are determined, the package location processing module 128 determines whether the packages located within a predetermined distance d from the delivery person computing device 114 are meant for the delivery location. The package location processing module 128 determines whether the packages 106a-106n located within a predetermined distance d of the delivery person computing device 114 belong to the delivery group for that location based on the RSSI estimated distances and the Group Sub-ID code associated with the delivery location stored in the fulfillment table. The package location processing 128 can further identify which of the packages was incorrectly included or omitted in the delivery group by using the Package ID and the Group Sub-ID code stored in the fulfillment table.

The delivery person computing device 114 may comprise a notification module 138 to notify the delivery person that a package 106a-106n associated with a radio tag 108a-108n does not belong with the group of packages 106 based at least in part on proximity of the radio tag 108a-108n relative to the delivery person computing device 114 and the unique Group sub-ID code associated with the customer delivery address. The display module may include, without limitation, a variety of visual, audible, and/or tactile feedback notification elements, such as displays, light emitting diodes (LEDs), speakers, buzzers, vibrators, among others.

In an alternative embodiment, the delivery confirmation computational overhead may be off loaded or shifted to an analytics engine 130 located at the remote delivery management system server 126 over channel 124. Accordingly, the delivery person computing device 114 is configured to transmit the received tracking information, e.g., the Package ID/Group Sub-ID code information, RSSI distance estimates to the packages, or package coordinates, over the network 122 to the delivery management system server 126 via the communication channel 124. The delivery management system server 126 includes a computational or analytics engine 130 and a database 132 configured to determine the location of the transmitting radio tags 108a-108n based on the RSSI estimated distances to the radio tags 108a-108n derived from the signals 110a-110n or the coordinates corresponding to the location of the radio tags 108a-108n. Accordingly, the analytics engine 130 is configured to compute precisely whether a group of packages selected for delivery to the delivery location includes an incorrect package or a missing package. As previously discussed, once an estimated distance d of the radio tags 108a-108n has been ascertained, the delivery management system server 126 can reconcile the packages included in the delivery group with the fulfillment table entries stored in a database 132 that identifies which packages are associated with the delivery group based on the Group Sub-ID code associated with the delivery location 102. The analytics engine 130 can further identify which of the packages was incorrectly included or omitted in the delivery group by using the Package ID and the Group sub-ID code stored in the fulfillment table.

Once the delivery management system server 126 determines that the package group 106 includes an incorrect package and/or a missing package, the delivery management system server 126 sends a notification message to a display device of the delivery person computing device 114 notifying the delivery person 112 (FIG. 1) of the error. Other forms of notification include, without limitation, any suitable visual, audible, and/or tactile feedback notification elements, such as displays, LEDs, speakers, buzzers, vibrators, among others, In another embodiment, the radio tags 108a-108n may comprise a transceiver 130a-130n to provide two-way communication with the delivery person computing device 114. In this embodiment, the radio tags 108a-108n can be configured to communicate the Package ID/Group Sub-ID codes only when they receive interrogation signals 136a-136n transmitted by the delivery person computing device 114.

Figure 3:
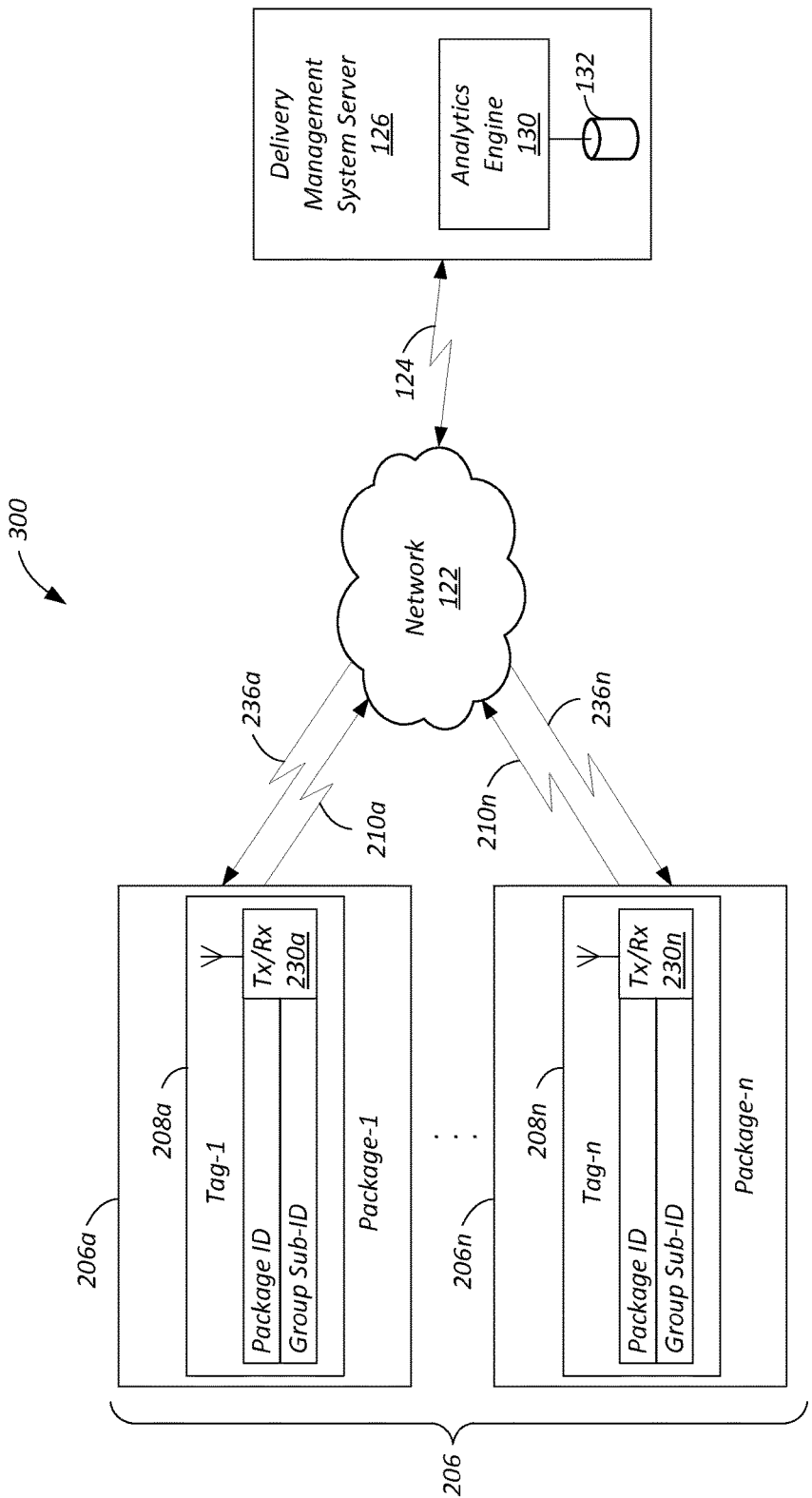
FIG. 3 is a diagram illustrating one embodiment of a system for confirming delivery of multiple packages using radio tags employing long range radio transmission techniques.

FIG. 3 is a diagram illustrating one embodiment of a system 300 for confirming delivery of multiple packages 206 using radio tags 208a-208n employing long range radio transmission techniques. The radio tags 208a-208n may include a transmitter for one-way communication with the network 122 or a transceiver for two-way communication with the network 122. In the illustrated embodiment, the radio tags 208a-208n comprise a transceiver 230a-230n for two-way communication with the delivery management system server 126 via the network 122. A computational analytics engine 130 in communication with the delivery management system server 126 is configured to is configured to process the long range radio signals 210a-210n from multiple receiving stations within the network 122. Accordingly, analytic methods in cloud computing processors can be employed to identify the location, e.g., coordinates, of the packages 206a-206n equipped with the radio tags 208a-208n. For example, multiple radio receiving stations within the network 122 can be configured to perform multilateration, trilateration, or triangulation to determine the coordinates of the location of the packages radio tags 208a-208n to ascertain the location of the packages 206a-206n. Based on such cloud based locationing techniques, similar to geofencing, the delivery management system server 126 can determine the location of the packages 206a-206n within a predetermined geometric area and determine whether a group of packages 206 being delivered to the delivery location 102 (FIG. 1) contains an incorrect package, is missing a package, or a combination thereof. The predetermined geometric area may be defined as an area in proximity to the delivery person computing device 114 or delivery truck 104 (FIG. 1) or in proximity to the delivery location 102.

Multilateration is a technique based on the measurement of the difference in distance to two radio tags 208a-208n at known locations that broadcast signals at known times. Multilateration can be used to accurately locate the radio tag 208a-208n transmitters by measuring the "time difference of arrival" (TDOA) of a signal from the radio tag 208a-208n transmitters at three or more synchronized receiver sites (surveillance application) or the signals from three or more synchronized radio tag 208a-208n transmitters at one receiver location (navigation application). Unlike measurements of absolute distance or angle, measuring the difference in distance between two stations results in an infinite number of locations that satisfy the measurement. When these possible locations are plotted, they form a hyperbolic curve. To locate the exact location along that curve, multilateration relies on multiple measurements: a second measurement taken to a different pair of radio tag 208a-208n transmitters will produce a second curve, which intersects with the first. When the two curves are compared, a small number of possible locations are revealed, producing a "fix" of the radio tag 208a-208n transmitter. In multilateration, a pulse emitted from a radio tag 208a-208n transmitter will generally arrive at slightly different times at two spatially separated receiver sites, the TDOA being due to the different distances of each receiver from the platform. For given locations of the two receivers, a whole set of emitter locations would give the same measurement of TDOA. Given two receiver locations and a known TDOA, the locus of possible emitter locations is a one half of a two-sheeted hyperboloid. This technique can thus be employed to determine the coordinates of the location of the radio tag 208a-208n transmitters.

Other suitable techniques for locating the radio tag 208a-208n transmitters and providing coordinates of the location of the radio tag 208a-208n transmitters include trilateration, which uses distances or absolute measurements of time-of-flight from three or more receiver sites, or with triangulation, which uses the measurement of absolute angles. Both of these systems are also commonly used with radio navigation systems; trilateration is the basis of GPS. Other suitable techniques may be employed without departing from the scope of the present disclosure.

The radio tags 208a-208n may be configured to transmit the Package ID/Group Sub-ID codes to the network 122 either periodically or randomly. In some embodiments, the transmissions may be at a fixed period or variable period. In circumstances where the transmission rate is variable, the radio tags 208a-108n can be configured to transmit at longer periods when located far away from the delivery location 102 (FIG. 1) and at shorter periods as they approach the delivery location 102. In other embodiments, however, the radio tags 208a-208n may transmit the PackageID/Group Sub-ID codes only when they receive an interrogation signal 236a-236n from the network 122. In one embodiment, the interrogations signals 236a-236n can be initiated by the delivery management system server 126.

As previously discussed, the coordinates of the radio tags 208a-208n may be determined by known techniques such as multilateration, trilateration, triangulation, among others, to ascertain the coordinates of the corresponding packages 206a-206n associated with the radio tags 208a-208n. Once the coordinates of the radio rags 208a-208n and thus the coordinates of the packages 206a-206n are received by the delivery management system server 126, the analytics engine 130 determines the location of the packages 206a-206n within a predetermined area and based on the Group Sub-ID code and the coordinates of the delivery location 102 (FIG. 1), which can be readily obtained by GPS satellite maps.

Figure 4:
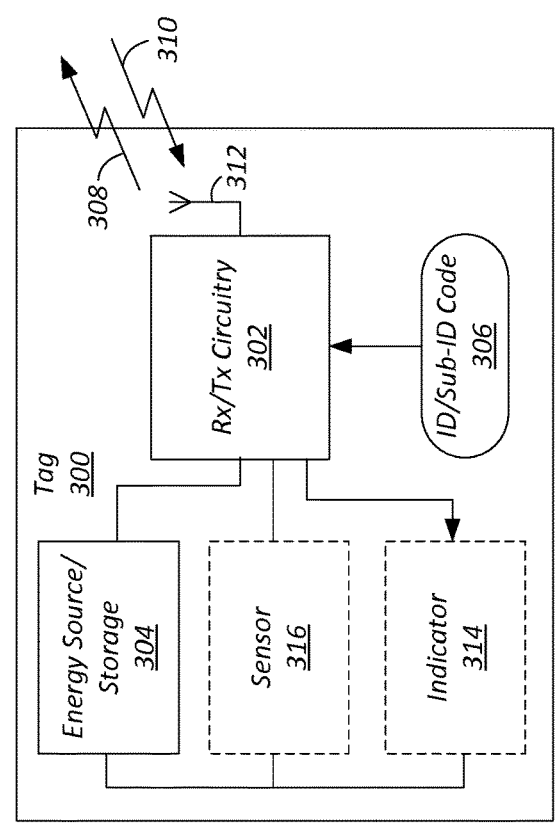
FIG. 4 is a block diagram illustrating an environment in which embodiments of the present invention may be implemented.

FIG. 4 is a diagram of one embodiment of a radio tag 300 that may be employed in a system 200 (FIG. 2), 300 (FIG. 3) for confirming the delivery of multiple packages to a delivery location 102 (FIG. 1) in accordance with various embodiments described in the present disclosure. The radio tag 300 described in connection with FIG. 4 may be suitable for use as one or more of the radio tags 108a-108n (FIGS. 1-2) and radio tags 208a-208n (FIG. 3), although other radio tags also may be suitable to affix to packages. The radio tag 300 may be associated with one item such as a package that is part of a group of packages 106 (FIG. 2), 206 (FIG. 3) to be delivered to a delivery location 102 (FIG. 1).

As shown in FIG. 4 the radio tag 300 may include an antenna 312 to receive interrogation signals 310 and transmit response signals 308. The interrogation signals 310 may correspond to the interrogation signals 136a-136n (FIG. 2) and interrogation signals 236a-236n (FIG. 2), and the response signals 308 may correspond to the response signals 110a-110n (FIG. 2) and response signals 210a-210n (FIG. 3). The radio tag 300 also may include transceiver circuitry 302 for receiving the interrogation signals 310 from the antenna 312, and for transmitting the response signals 308. Each radio tag 300 may have a unique package ID and group sub-ID code 306 associated therewith. The antenna 312 may be a coil antenna, although other antennas may also be suitable. In an alternative embodiments, the radio tag 300 may be configured to periodically (fixed or variable) or randomly transmit a response signal 308 without first receiving an interrogation signal. In such alternative embodiment, the transceiver circuitry 302 may be replaced with a simple transmitter.

The radio tag 300 may generate a response signal 308 in response to an interrogation signal 310 transmitted by a delivery person computing device 114 (FIGS. 1-2), 320 (FIG. 4) or transmitted by a radio base station in the network 122 (FIGS. 1 and 3). The response signal 308 may include the unique Package ID/Group Sub-ID code 306 that associates the particular radio tag 300 with a package in a particular group of packages to be delivered to a single delivery location such as the customer's home 102 (FIG. 1). As previously discussed, the unique Package ID/Group Sub-ID code 306 may be programmed into the radio tag 300 at the fulfillment center to associate multiple radio tags 300 with corresponding packages into a group.

In some embodiments, the radio tag 300 may comprise an energy source/storage element 304. In one embodiment, the energy source/storage element 304 may be a battery. In other embodiments, the energy source/storage element 304 may be an energy harvester configured to harvest ambient energy such as current induced on the antenna 312 by interrogation signal 310 to generate the response signal 308. Other energy harvesting techniques may include magnetic induction, solar, etc. In embodiments where the radio tag 300 includes an energy harvester, no battery is generally included as part of the radio tag 300. In these embodiments, the interrogation signal 310 may induce a current on the antenna 312 to charge an energy storage device until a suitable amount of energy is available to power the transceiver circuitry 302 to transmit the radio tag's 300 unique Package ID/Group Sub-ID code 306 as part of a response signal 308. In such embodiments, a capacitive storage element (e.g., energy source/storage element 304) which may temporarily store some energy generated from the interrogation signal 310 is provided.

In some embodiments, the radio tag 300 may comprise an internal power source to generate the response signal 308 either in response to the interrogation signal 310 or as part a periodic (fixed or variable)/random transmission protocol.

In some embodiments, a battery or other energy storage element may be included as part of the radio tag 300 energy source/storage element 304. In these embodiments, the energy source/storage element 308 may power the transceiver circuitry 302 to allow the transceiver circuitry 302 to transmit the radio tag's 300 unique Package ID/Group Sub-ID code 306 as part of the response signal 308. In some embodiments, systems that employ the radio tag 300 may have greater proximity thresholds than systems that use energy harvesting techniques because a response signal 308 generated by a battery operated radio tag may be more powerful than a signal generated by an energy harvester powered radio tag. In some embodiments, the proximity thresholds of systems employing battery powered radio tags may be able to transmit up to 100 feet and even greater distances. In some embodiments, the radio tag 300, may include a built-in memory, although the scope of the present disclosure is not limited in this respect.

In some embodiments, the radio tag 300 may comprise a sensor 316 for sensing environmental variables. Sensors for measuring such environmental variables include, without limitation, temperature sensors, pressure sensors, shock sensors, accelerometers, gradiometers, solid state gyroscopes (e.g., MEMS—microelectromechanical systems), humidity sensors, among other sensors.

In one embodiment, the radio tag 300 may comprises an indicator 314. The indicator 314 may be a audible, visual, or tactile indicator such as a speaker, light emitting diode, buzzer, for example. The indicator 314 may be employed to identify which packages belong to a group of packages to be delivered at the delivery location. Thus, as the delivery truck pulls up near the delivery location, the radio tags 300 associated with the packages for the particular location will activate the indicator 314 and, for example, start beeping, blinking, or buzzing to facilitate selection of the packages to be delivered at the location.

Figure 5:
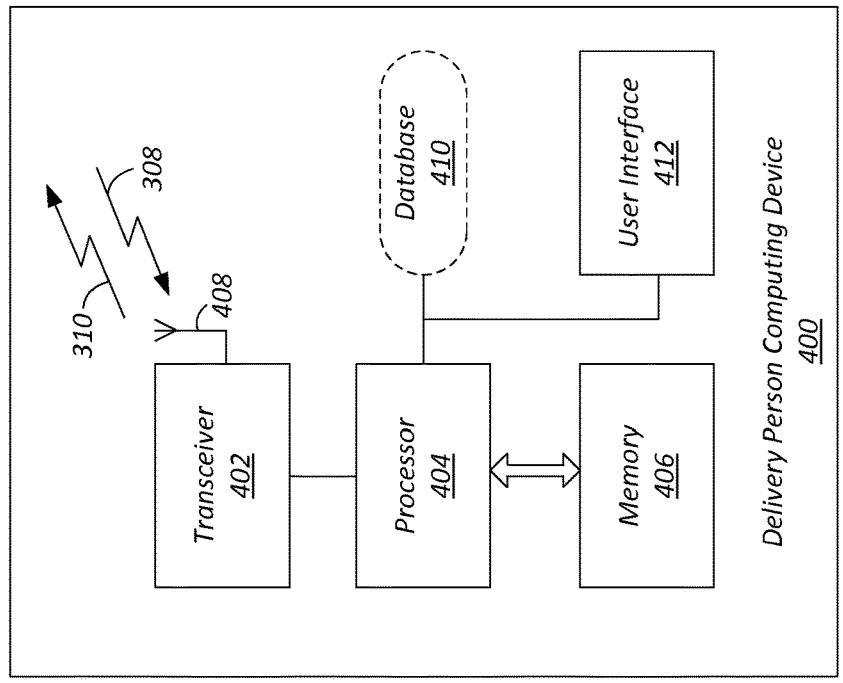
FIG. 5 is a diagram of one embodiment of a package tracking device that may be employed in a system for confirming delivery of multiple packages to a delivery location in accordance with various embodiments described in the present disclosure.

FIG. 5 is a diagram of one embodiment of a package tracking device, such a delivery person computing device 400 that may be employed in a system for confirming delivery of multiple packages to a delivery location in accordance with various embodiments described in the present disclosure. The delivery person computing device 400 described in connection with FIG. 5 is a computing device that may be suitable for use with one or more of the radio tags 300 (FIG. 4), 108a-108n (FIGS. 1-2), and radio tags 208a-208n (FIG. 3), although other package tracking devices also may be suitable. The delivery person computing device 400 may correspond to the delivery person computing device 114 (FIGS. 1-2). The delivery person computing device 400 may have circuitry to determine the proximity of the packages tagged with the radio tags 300 (FIG. 4) based on signal strength levels of the response signals 308 (FIG. 4) from the radio tags 300. The delivery person computing device 400 also may have circuitry to notify the delivery person 112 (FIG. 1) when certain ones of the tagged packages are outside a proximity threshold. In some embodiments, the delivery person computing device 400 may use a RSSI to determine when tagged packages are outside a proximity threshold. In some embodiments, the circuitry for performing various operations by the delivery person computing device 400 may include a combination of software, firmware, and/or logic circuitry operating with a processing system, although the scope of the present disclosure is not limited in this respect. In some embodiments, a notification may be provided when certain packages are within a proximity threshold, although the scope of the present disclosure is not limited in this respect.

As shown in FIG. 5, the delivery person computing device 400 may comprise a transceiver 402 to transmit interrogation signals 310 to radio tags and to receive response signals 308 from the radio tags. The delivery person computing device 400 also may comprise a processor 404 to determine the proximity of tagged packages based on signal strength levels of the response signals 308. In some embodiments, RSSI may be used to determine the proximity of the radio tags, although the scope of the present disclosure is not limited in this respect. In some embodiments, the processor 404 may notify the delivery person when certain ones of the tagged packages are outside a proximity threshold.

In some embodiments, the delivery person computing device 400 includes a memory 406 which may maintain a list of nearby packages (i.e., within communication range but not necessarily within a proximity threshold) by regularly transmitting the interrogation signal 310. In these embodiments, the delivery person computing device 400 may maintain a list of the packages that are within a proximity threshold, although the scope of the present disclosure is not limited in this respect.

In some embodiments, the processor 404 may perform a collision avoidance algorithm to distinguish between response signals received substantially simultaneously from more than of the radio tags being interrogated.

In some embodiments, the package delivery device 400 may further comprise an antenna 408 coupled to a transceiver 402. The antenna 408 may be selected to have characteristics based on a frequency range of the radio tags 300 (FIG. 4). The antenna 408 may comprise a directional or omnidirectional antenna, including, for example, a dipole antenna, a monopole antenna, a loop antenna, a microstrip antenna or other type of antenna suitable for the transmission and/or reception of radio frequency signals with the radio tags 300 (FIG. 1). In some embodiments, the antenna 408 may be a patch or a coil antenna, although the scope of the present disclosure is not limited in this respect. In some embodiments, when the antenna 408 is a patch antenna, the patch antenna may comprise a solid piece of metal or foil. In some embodiments, when the antenna 408 is a directional antenna, its directivity may be used to help locate managed packages.

In some embodiments, the delivery person computing device 400 further comprises an electronic storage location to store a database 410. The database 410 may include the unique Package ID/Group Sub-ID codes of the radio tags, a description of the items associated with the packages, the delivery address, and in some embodiments, a proximity threshold associated with each package. In some embodiments, the database 410 may further comprise one or more groups associated with each package.

In some embodiments, the master controller 200 may include a user interface 412. The user interface 412 may, among other things, allow the selection of a package group by the delivery person, may receive additional package descriptions (e.g., the items inside the proximity threshold), and may be used to configure or assign the radio tags with the Package ID/Group Sub-ID codes to associate the packages with a particular group of packages. In some embodiments, the user interface 412 may further display a description of packages of the selected group that are outside the proximity threshold, although the scope of the present disclosure is not limited in this respect. In some embodiments, a delivery person may interface with the delivery person computing device 400 and select groups and associated packages by voice activation. The user interface 412 may be any type of display or user interface including a graphical user interface (GUI), although the scope of the invention is not limited in this respect.

In some embodiments, a delivery person may select the package identification through the user interface 412, the processor 404 may determine which packages associated with the selected group are not within a proximity threshold for the selected package group and may alert the user with an alert message or signal. In some embodiments, the user interface 412 may display the packages associated with the selected group that are not within the proximity threshold. In some embodiments, the delivery person computing device 400 may be programmable to automatically select one of the package groups. In some embodiments, the automatic selection of package groups may be based on a delivery location.

In some embodiments, the processor 404, based on a signal strength of return signals 308, may determine when one of the packages that were not within the proximity threshold for the selected group comes into the proximity threshold for the selected group and may provide an alert to the delivery person.

In some embodiments, the delivery person computing device 400 may be part of (or integrated into) a wireless communication device, such as a cellular or mobile telephone, a tablet computer, a personal digital assistant (PDA), or other handheld portable communication device, although the scope of the present disclosure is not limited in this respect. In some embodiments, the wireless communication device may be a laptop or portable computer with wireless communication capability, a pager, an instant messaging device, a digital camera, an access point or other device that may receive and/or transmit information wirelessly. In some embodiments, the wireless communication device may transmit and/or receive RF communications in accordance with specific communication standards, such as the Institute of Electrical and Electronics Engineers (IEEE) standards including IEEE 802.11(a), 802.11(b), 802.11(g/n) and/or 802.11(n) standards for wireless local area networks (WLANs) and/or 802.16 standards for wireless metropolitan area networks (WMANs), although the wireless communication device may also be suitable to transmit and/or receive communications in accordance with other techniques including the Digital Video Broadcasting Terrestrial (DVB-T) broadcasting standard, and the High performance radio Local Area Network (HiperLAN) standard.

Although for some embodiments, the delivery person computing device 400 is described as being part of a wireless communication device, the delivery person computing device 400 may be a stand-alone device, while in other embodiments, the delivery person computing device 400 may be part of almost any wireless and/or wireline communication device, including a general purpose processing or computing system such as a remotely located delivery management system server. In some embodiments, the delivery person computing device 400 may part of be a battery-powered device, although the scope of the present disclosure is not limited in this respect.

Although the delivery person computing device 400 is illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein.

With reference now to FIGS. 1 and 5, when the delivery person 112 is preparing to deliver a multiple package group 106 to a single delivery location such as the customer's home 102, the delivery person 112 may spend time looking for these packages 106 in the delivery truck 104, and in some cases, may simply forget some packages or include the incorrect packages in the delivery group 106. Through the use of the delivery person computing device 114, 400, the delivery person 112 may no longer have to search for packages that make up the group 106 and can easily determine if any packages have been omitted or incorrectly included in the delivery group 106. In accordance with various embodiments, the delivery person 112 may be notified by the delivery person computing device 114, 400 when a managed package is forgotten, left behind, or not within close proximity. This allows the delivery person 112 to focus attention on other things rather than scanning packages to determine which ones are to be included in the delivery group 106. In some embodiments, the package tracking device 112 may be an integral part of the delivery person's 112 wireless telephone or PDA to avoid having to carry an extra device. Accordingly, the system 100 may allow a user to determine when a package is forgotten, misplaced, omitted, or otherwise incorrectly included in a delivery of a multiple package group 106, and where the packages are located.

With reference now to both FIGS. 4 and 5, In accordance with some embodiments, the radio tags 300 may be affixed or adhered to the packages during an initializing process at the fulfillment center which is described in more detail below. In some embodiments, the delivery person computing device 400 maintains a list of nearby packages (i.e., within communication range) by regularly transmitting an interrogation signal to the radio tags 300, and may further maintain a list of the items that are within proximity threshold.

With reference now still to both FIGS. 4 and 5, each of the radio tags 300 may have a unique identification code 306 associated with the radio tag 300, and each tag 300 may generate a response signal 308 in response to an interrogation signal 310 transmitted by a transceiver 402 section of the delivery person computing device 400. The response signal 310 may include the unique identification code 306 associated with the radio tag 300, and hence the package and group, allowing the delivery person computing device 400 to uniquely identify the radio tag 300 and the associated package. Furthermore, in some embodiments, the delivery person computing device 400 may be able to determine the range of the tagged package from the signal level of the response signal 308.

In some embodiments, the delivery person computing device 400 may perform a collision avoidance algorithm to distinguish between response signals received substantially simultaneously from more than one of the radio tags 300 that are being interrogated, although the scope of the present disclosure is not limited in this respect.

In some embodiments, the delivery person computing device 400 may include a storage location or memory element 406 to store a database 410. The database 410 may include the unique Package ID/Group Sub-ID codes 306 of each of the radio tags 300 associated with particular packages or group of packages to be delivered to a single delivery location, a description of the items associated with the packages, the delivery location, and a proximity threshold, which may be associated with each package, although the scope of the present disclosure is not limited in this respect. In some embodiments, the database 410 may further include the group associated with each package. With reference also now to FIGS. 1 and 2, it will be appreciated that the database 410 may be stored remotely at the delivery management system server 126, for example.

FIG. 6 is a fulfillment table 500 illustrating package descriptions and associated delivery group in accordance with some embodiments. The table 500 includes the radio tag Package ID code 502, the Group Sub-ID code 504, a package reference number 506, a description of the items 508 associated with the packages, and the delivery location 510 associated with the tracking information and in particular with the Group Sub-Id code 504. The table 500 may be generated at the fulfillment center where the items are picked from a computer recorded location to make up an individual shipment for a delivery location. A shipment may require that the items 506 be separately packed and grouped for a particular delivery location 508. Accordingly, the radio tags are programmed with the tracking information comprising a unique Package ID code 502 that identifies the package and a Group Sub-ID code 504 that identifies the group of packages to be delivered to a common delivery location 510. The radio tags are then applied to each individual package and shipped. A computer records the information in the table 500, which is also communicated with a central computer or delivery management system server where their rate of progress can be monitored. The fulfillment table 500 can be stored in the delivery person computing device 114 (FIG. 2) or in a database 132 at the remote delivery management system server (FIGS. 1 and 2).

In the example illustrated in FIG. 6, the fulfillment table 500 includes five separate packages P1-1 to P5-1 associated with a delivery location to John Doe at 123 Bear Lane, Coffeeville, Wash. and four packages P1-2 to P4-2 associated with a delivery location to Jane Roe at 456 Shady Pine Drive, Bayside, Wash. Accordingly, to determine whether packages selected for delivery include an incorrect package or is missing a package, the received Group Sub-Id codes can be compared with the Group Sub-ID codes 504 stored in the table 500. The stored Group Sub Id codes 504 are associated with the actual delivery location based on the coordinates (e.g., GPS coordinates) of the delivery location. More particularly, the actual incorrect or missing package can be identified. by also comparing the received Package ID codes with the Package Id codes 502 stored in the table 500 that are associated with the Group Sub-Id codes 504 for the delivery location. These nine packages could be shipped in the same delivery truck or may be shipped in separate delivery trucks. The five packages P1-1 to P5-1 to be delivered to John Doe and the four packages P1-2 to P4-2 to be delivered to Jane Roe include unique radio tags ID/sub-ID codes as shown in the table 500. These unique radio tags Package ID/Group Sub-ID codes are transmitted by the radio tags to the delivery person computing 114 or the delivery management system server 126 depending on the particular system implementation, as previously described.

Figure 7:
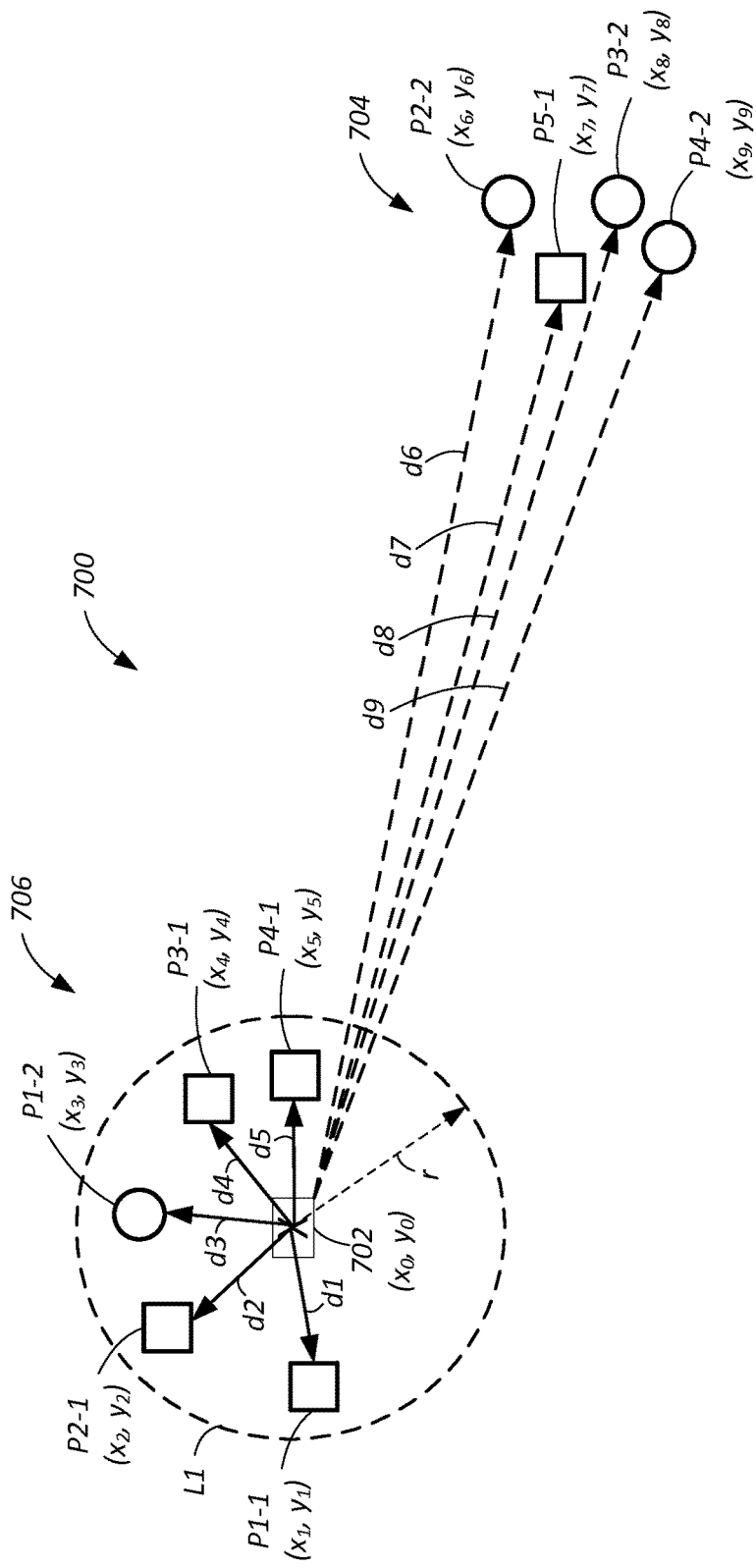
FIG. 7 is a package location diagram illustrating estimated distances between a reference point and the packages selected for delivery

FIG. 7 is a package location diagram 700 illustrating estimated distances d1-d9 between a reference location 702 located at coordinates $(x_0, y_0)$ and the packages P1-1 located at coordinates $(x_1, y_1)$, P2-1 at $(x_2, y_2)$, P1-2 at $(x_3, y_3)$, P3-1 at $(x_4, y_4)$, P4-1 at $(x_5, y_5)$, P2-2 at $(x_6, y_e)$, P5-1 at $(x_7, y_7)$, P3-2 at $(x_8, y_8)$, and P4-2 at $(x_9, y_9)$, in accordance with some embodiments. The estimated distances d1-d9 between a reference location 702 and the location of the packages P1-1 to P5-1 and P1-2 to P4-2 at or near the delivery location can be determined using either RSSI distance estimates relative to the reference location 702 or using package coordinates relative to the coordinates of the reference location 702. The reference location 702 can be the location of the delivery person computing device 114 (FIG. 1), the delivery location 102 (FIG. 1) itself, or another package Once the distance estimate d1-d9 are determined either by RSSI measurements or using actual coordinates, a perimeter L1 is defined at a predetermined radius r that defines an area proximal to the reference location 702. Upon defining the proximal area, the packages P1-1 to P5-1 and P1-2 to P4-2 located within the proximal area are compared with the packages listed in the fulfillment table that are associated with the delivery location based on the Group ID code. The actual packages also can be identified by employing the Package ID code in addition to the Group ID code.

With reference now to the fulfillment table 500 shown in FIG. 6 and the package location diagram 700 shown in FIG. 7, it can be seen that a first group of five packages 706 has been selected for delivery and a second group of four packages 704 has been left behind, e.g., remain in the delivery truck. As previously described, the estimated distances d1-19 may be determined using either RSSI or actual coordinates. If RSSI is used to determine estimated distances from the delivery person computing device 114 (FIG. 1) then the reference location 702 is the location of the delivery person computing device 114. If coordinates are used, then the reference location 702 may be the delivery person computing device 114 or the delivery location 102 (FIG. 1). The coordinates of the reference location 702 ($x_0$, $y_0$) can be readily determined using GPS, GPS maps, or other suitable means. Once the estimated distances d1-d9 are determined, the Group Sub-Id codes of the packages P1-1, P2-1, P1-2, P3-1, and P4-1 located within the predetermined area L1 as received either by the delivery person computing device 114 or the delivery system management server 126 are compared to the Group Sub-Id codes 504 listed in the fulfillment table 500 that are associated with the delivery location. In the present example, the delivery location is associated with Group Sub-Id code "1." Thus, package P1-2, which is associated with Group Sub-Id "2" is identified as being incorrectly included in group 706. The received Group Sub-Id codes associated with the present delivery location is useful only to identify that the package P1-2 belonging to another delivery location has been incorrectly selected for delivery at the present delivery location or that the package P5-1 was omitted form the delivery group 706. The Package ID code 502 can be used to further identify the actual package that was incorrectly included P1-2 or omitted P5-1.

As previously discussed, the estimated distances are periodically updated and distances and/or coordinates also are updated periodically over time. Thus, packages that initially may appear in one location due to statistical margins of error will appear in the proper location as the packages being delivered approach the delivery location coordinates and the other packages remain in the delivery truck. Accordingly, over time and as the packages approach the delivery location, the statistical techniques employed to determine package location improve in accuracy.

Figure 8:
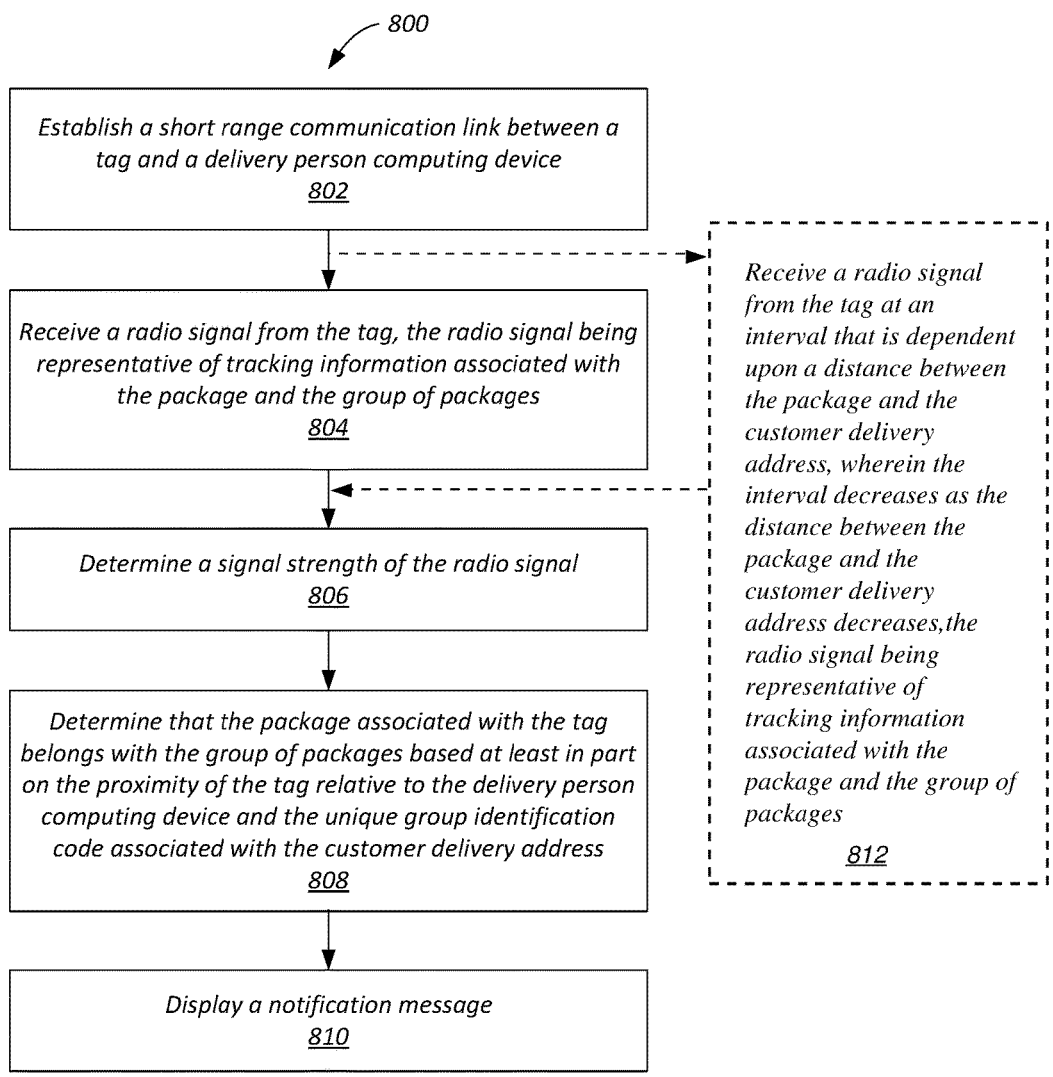
FIG. 8 is a flow diagram illustrating one embodiment of a method of managing delivery of a group of packages to a customer delivery address associated with a customer, where the method employs distance estimates to the packages from a reference point based on RSSI.

FIG. 8 is a flow diagram illustrating one embodiment of a method 800 of managing delivery of a group of packages to a customer delivery address associated with a customer. With reference also to FIG. 2, which provides an example environment 200, in accordance with the method 800 a short range communication link is established 802 between a tag 108a-108n and a delivery person computing device 114 using a radio transceiver 130a-130n, the tag 108a-108n being associated with a package 106a-106n and a package group 106 comprising the package 108a-108n to be delivered to the customer delivery address. The delivery person computing device 114 receives 804 over the short range communication link, a radio signal 110a-110n from the tag 108a-108n, the radio signal 110a-110n being representative of a tracking information associated with the package and the group of packages to be delivered to the customer delivery address, the tracking information comprising a unique package identification code (Package ID code) and a unique group identification code (Group Sub-ID code). In some embodiments, the delivery person computing device receives 812 over the short range communication link, a radio signal from the tag at an interval that is dependent upon a distance between the package and the customer delivery address, wherein the interval decreases as the distance between the package and the customer delivery address decreases, the radio signal being representative of tracking information associated with the package, the tracking information comprising a unique package identification code and a unique group identification code. The delivery person computing device 114 determines 806 a signal strength of the radio signal 110a-110n representative of the tracking information. The method 800 then determines 808 whether the package associated with the tag belongs with the group of packages based at least in part on proximity of the tag relative to the delivery person computing device 114 and the unique Group Sub-ID code associated with the customer delivery address. This can be determined either by the delivery person computing device 114 or the remote delivery management system server 126. The notification module 138 displays 810 a notification message on a display device.

In one embodiment, the delivery person computing device 114 is configured to receive the radio signal 110a-110n from the tag 108a-108n over the short range communication link at a predetermined fixed interval, at a variable interval, or at an interval that is dependent upon a distance between the tag 108a-108n and the customer delivery address such that the period decreases as the tag 108a-108n approaches the customer delivery address.

In one embodiment, the delivery person computing device is configured to transmit an interrogation signal 136a-136n to the tag 108a-108n and to receive a response signal 110a-110n from the tag 108a-108n in response to the interrogation signal 136a-136n.

In one embodiment, the delivery person computing device 114 is configured to transmit over a wide area network 122, from the delivery person computing device 114 to a delivery management system server 126, the tracking information and information associated with the signal strength of the radio signal. The delivery person computing device 114 is configured to receive over the wide area network 122, at the delivery person computing device 114 from the delivery management system server 126, an estimated distance of the tag 108a-108n relative to the delivery person computing device 114 based on the signal strength of the radio signal.

In one embodiment, the delivery person computing device 114 is configured to identify the package associated with the tag belonging with the group of packages based at least in part on the unique Package ID code and the unique Group ID code associated with the customer delivery address.

Figure 9:
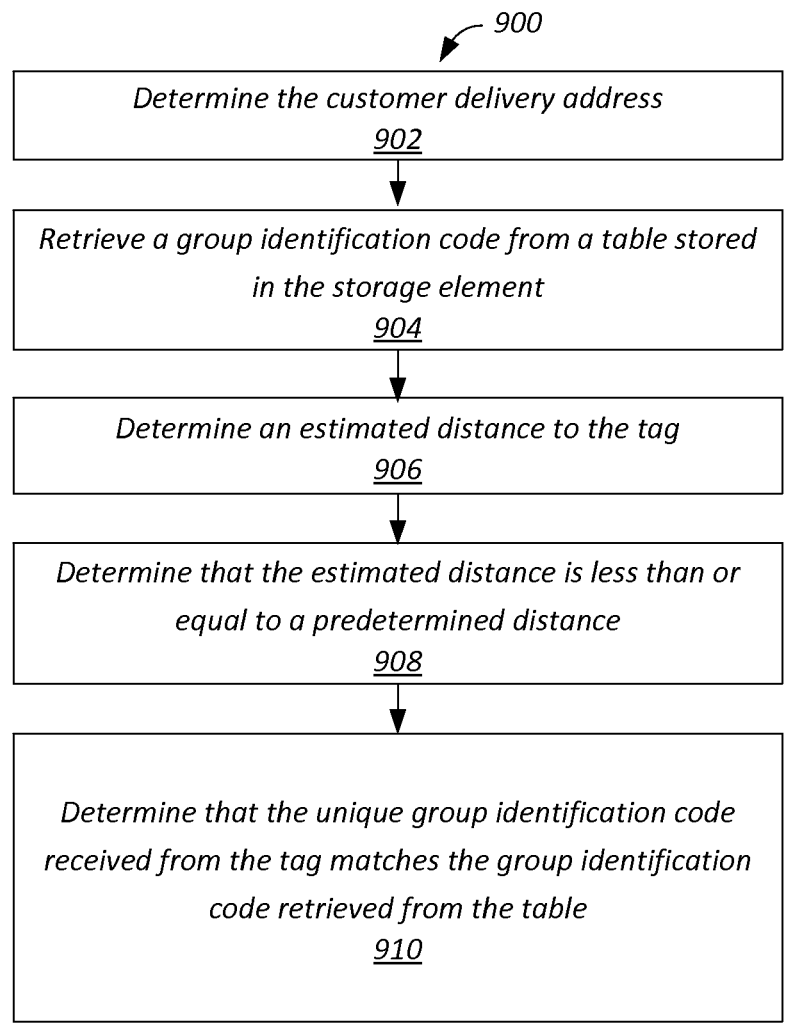
FIG. 9 is a method of determining whether the package associated with the tag belongs with the group of packages based at least in part on proximity of the tag relative to the delivery person computing device and the unique Group Sub-ID code associated with the customer delivery address.

FIG. 9 is a method 900 of determining whether the package associated with the tag belongs with the group of packages based at least in part on proximity of the tag relative to the delivery person computing device 114 and the unique Group Sub-ID code associated with the customer delivery address. With reference now to FIGS. 2, 6, 7, and 9, the delivery person computing device 114 determines 902 the customer delivery address 510. The delivery person computing device 114 retrieves 904 a Group Sub-ID code

504 from a table 500 stored in the storage element. The delivery person computing device 114 determines 906 an estimated distance d1-d9 to the tag attached to the package P1-1 to P5-1 and P1-2 to P4-2. The delivery person computing device 114 determines 908 that the estimated distance d1-d9 is less than or equal to a predetermined distance r from the delivery person computing device 114 located at reference location 702. The delivery person computing device 114 determines 910 that the received unique group identification code received from the tag matches the group identification code, e.g., the Group Sub-ID code 504, retrieved from the table 500. The delivery person computing device 114 provides a notification upon determining that the received group identification code either matches or does not match the Group Sub-ID code 504 stored in the table 500.

Figure 10:
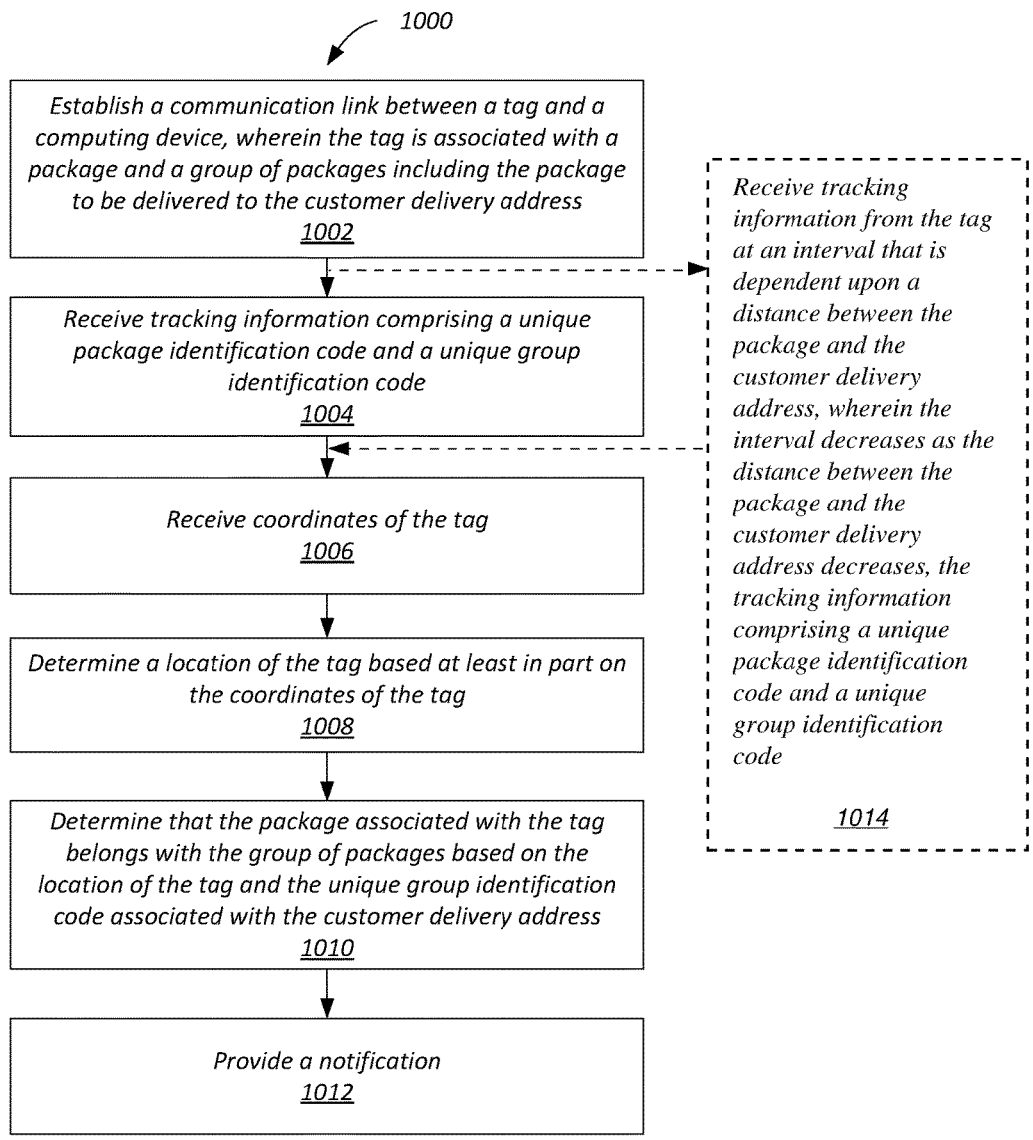
FIG. 10 is a flow diagram illustrating one embodiment of a method of managing delivery of a group of packages to a customer delivery address associated with a customer, where the method is implemented at a delivery management system server.

FIG. 10 is flow diagram illustrating one embodiment of a method 1000 of managing delivery of a group of packages to a customer delivery address associated with a customer. With reference also to FIG. 3, which provides an example environment 300, in accordance with the method, a communication link is established 1002 between a tag 208a-208n and a computing device 126. The tag 208a-208n is associated with a package 206a-206n and a group of packages 206 comprising the package 206a-206n to be delivered to the customer delivery address. The computing device 126 receives 1004 tracking information comprising a unique package identification code (Package ID) and a unique group identification code (Group Sub-ID). In some embodiments, the computing device 126 receives 1014 tracking information from the tag at an interval that is dependent upon a distance between the package and the customer delivery address, wherein the interval decreases as the distance between the package and the customer delivery address decreases, the tracking information comprising a unique package identification code and a unique group identification code. The computing device 126 receives 1006 coordinates of the tag 208a-208n. The computing device 126 determines 1008 a location of the package 206a-206n associated with the tag 208a-208n based at least in part on the coordinates of the tag 208a-208n. Once the computing device 126 receives the coordinates of the tag 208a-208n, the computing device 126 determines 1010 that the package 206a-206n associated with the tag 208a-208n belongs with the group of packages based on the location of the tag 208a-208n and the unique group identification code associated with the customer delivery address. The computing device 126 provides a notification.

In one embodiment, the computing device 126 is configured to receive a tracking information from the tag 208a-208n at a predetermined fixed period, at a variable period, at a period that is dependent upon a distance between the tag 208a-208n and the customer delivery address such that the period decreases as the tag approaches the customer delivery address, or in response to an interrogation signal 236a-236n.

In one embodiment, the computing device 126 identifies the package 206a-206n associated with the tag 208a-208n belonging with the group of packages based at least in part on the unique Package ID code and the unique Group ID code associated with the customer delivery address.

In one embodiment, the computing device 126 determines the location of the tag 208a-208n based at least in part on receiver signal strength values using RSSI.

Figure 11:
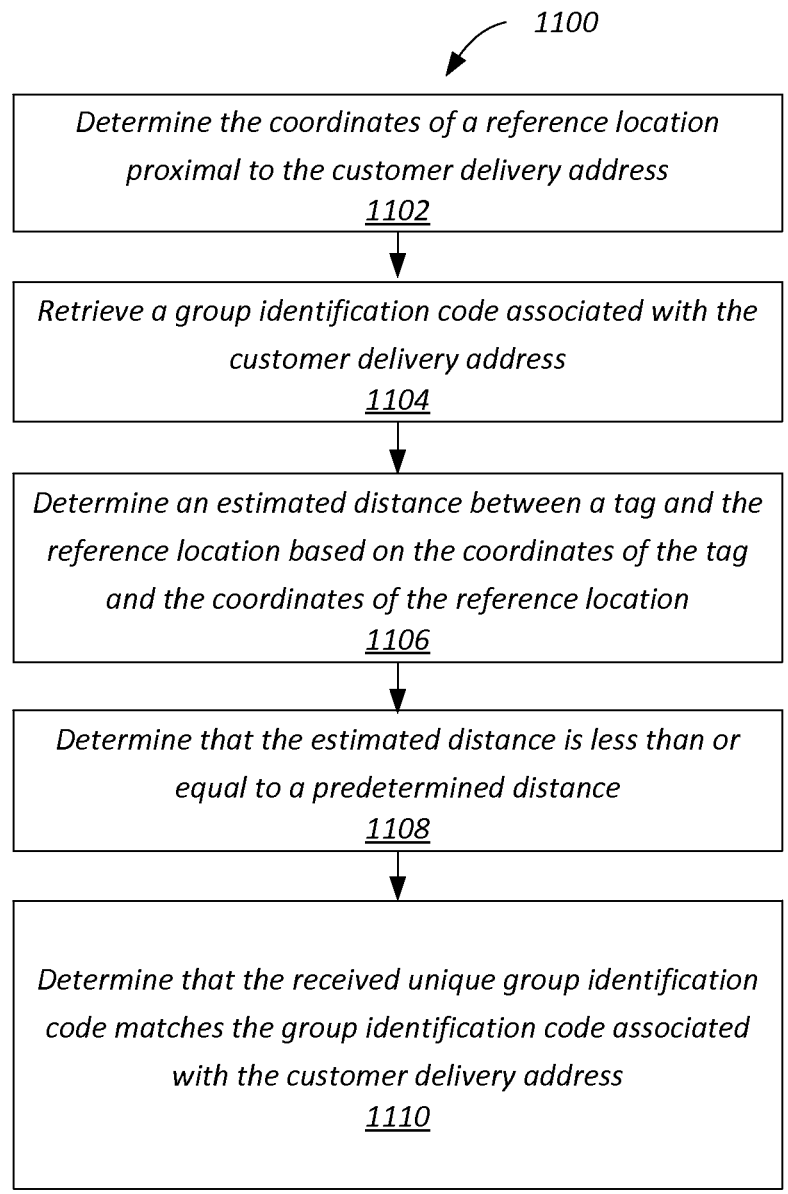
FIG. 11 is a method of determining whether the package associated with the tag belongs with the group of packages based at least in part on coordinates of the tag relative to a reference location and a unique Group Sub-ID code associated with the customer delivery address.

FIG. 11 is a method 1100 of determining whether the package associated with the tag belongs with the group of packages based at least in part on coordinates of the tag relative to a reference location and a unique package group identification code associated with the customer delivery address. With reference now to FIGS. 3, 6, 7, and 11, the computing device 126 determines 1102 the coordinates of a reference location proximal to the customer delivery address 506. The computing device 126 retrieves 1104 a Group Sub-ID code 504 from a table 500 stored in the storage element. The computing device 126 determines 1106 an estimated distance d1-d9 between a tag and a reference location 702 based on the coordinates of the tag and the coordinates of the reference location 702. The computing device 126 determines 1108 that the estimated distance is less than or equal to a predetermined distance r from the reference location 702. The computing device 126 determines 1110 that the unique group identification code matches the Group Sub-ID code 504 associated with the customer delivery address 506 stored in the table 500. The computing device 126 optionally provides a notification upon determining that the received group identification code either matches or does not match the Group Sub-ID code 504 stored in the table 500. In one embodiment, the reference location 702 is the delivery person computing device 114 (FIG. 1). In one embodiment, the reference location 702 is the customer delivery address 102 (FIG. 1).

Figure 12:
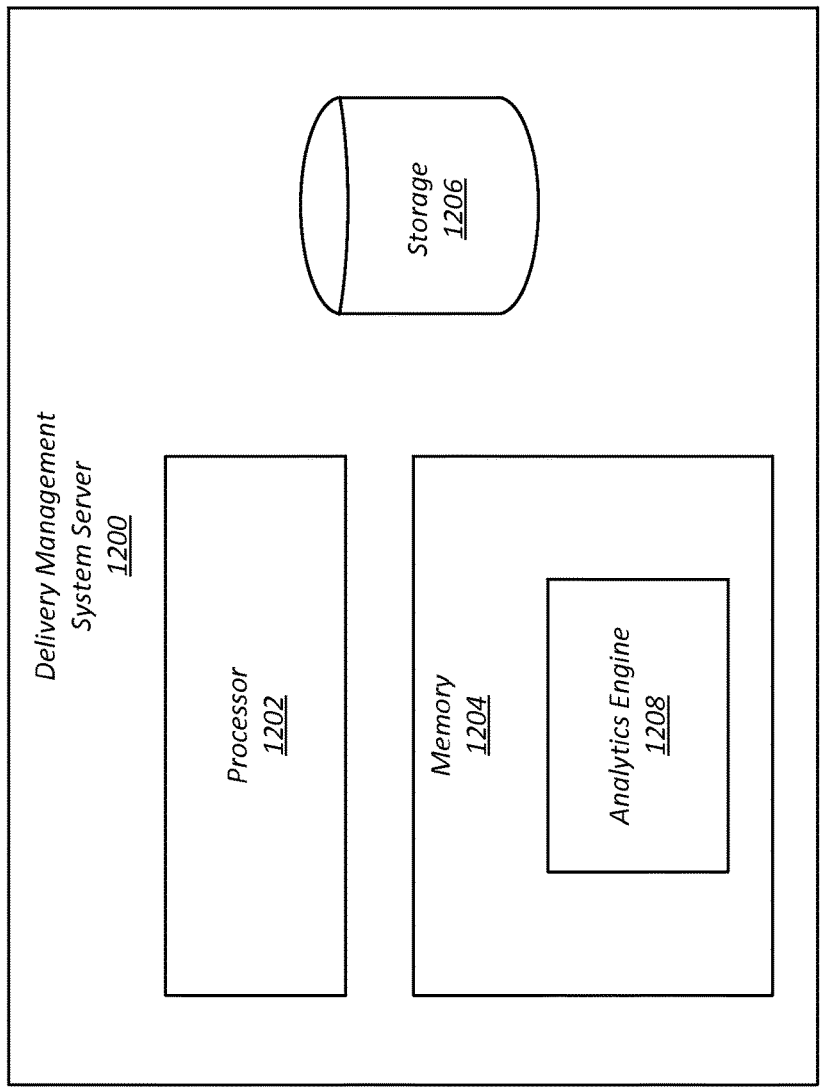
FIG. 12 is a diagram illustrating a configuration of a delivery management server.

FIG. 12 is a diagram illustrating a configuration of a delivery management server 1200. FIG. 12 shows a an example of an architecture of delivery management server 1200, consistent with a disclosed embodiment. Although the following discussion refers to delivery management server 1200, other servers may include components equivalent to those that are discussed below in connection with FIG. 12. The delivery management system server 1200 may include a processor 1202, a memory 1204, and a data store 1206. The memory 1204 may be one or more memory or storage devices that store data as well as software. The memory 1204 may comprise, for example, one or more of RAM, ROM, magnetic storage, or optical storage. Furthermore, the memory 1204 may store logic for an analytics engine 1208, which when executed by processor 1202, perform one or more processes for confirming delivery of multiple packages to a delivery location using package tags.

With reference to FIGS. 2 and 12, in one embodiment, the computational or analytics engine 1208 and the data store 1206 of the delivery management server 1200 are configured to determine the location of the transmitting radio tags 108a-108n based on the RSSI estimated distances to the radio tags 108a-108n derived from the signals 110a-110n or the coordinates corresponding to the location of the radio tags 108a-108n, as described in FIG. 2. Accordingly, the analytics engine 1208 is configured to compute precisely whether a group of packages selected for delivery to the delivery location includes an incorrect package or a missing package. As previously discussed, once an estimated distance d of the radio tags 108a-108n has been ascertained, the delivery management system server 1200 can reconcile the packages included in the delivery group with the fulfillment table entries stored in the data store 1206 that identifies which packages are associated with the delivery group based on the Group Sub-ID code associated with the delivery location 102. The analytics engine 1208 can further identify which of the packages was incorrectly included or omitted in the delivery group by using the Package ID and the Group sub-ID code stored in the fulfillment table. The delivery management system server 1200 determines that the package group includes an incorrect package and/or a missing package. The delivery management system server 1200 sends a notification message to a display device of the delivery person computing device 114 notifying the delivery person 112 (FIG. 1) of the error. Other forms of notification include, without limitation, any suitable visual, audible, and/or tactile feedback notification elements, such as displays, LEDs, speakers, buzzers, vibrators, among others.

With reference now to FIGS. 3 and 12, in one embodiment, the computational analytics engine 1208 element of the delivery management system server 1200 processes information transmitted over long range radio signals 210a-210n from multiple receiving stations within the network 122. Accordingly, analytic methods in cloud computing processors can be employed to identify the location, e.g., coordinates, of the packages 206a-206n equipped with the radio tags 208a-208n. For example, multiple radio receiving stations within the network 122 can be configured to perform multilateration, trilateration, or triangulation to determine the coordinates of the location of the packages radio tags 208a-208n to ascertain the location of the packages 206a-206n. Based on such cloud based locationing techniques, similar to geofencing, the delivery management system server 1200 can determine the location of the packages 206a-206n within a predetermined geometric area and determine whether a group of packages 206 being delivered to the delivery location 102 (FIG. 1) contains an incorrect package, is missing a package, or a combination thereof. The predetermined geometric area may be defined as an area in proximity to the delivery person computing device 114 or delivery truck 104 (FIG. 1) or in proximity to the delivery location 102.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A computer-implemented method of managing a delivery of packages to a customer, the method comprising:

establishing a short range communication link between a tag and a delivery person computing device using a radio transceiver, the tag being attached to a package, the package being among a group of packages to be delivered to a customer delivery address;

receiving over the short range communication link, by the delivery person computing device, a radio signal from the tag, the radio signal being representative of tracking information associated with the package, the tracking information comprising a unique package identification code associated with the package and a first unique group identification code associated with a package group to which the package is associated;

determining, at the delivery person computing device, a signal strength of the radio signal;

determining, at the delivery person computing device, an estimated distance from the delivery person computing device to the tag based on the signal strength of the radio signal;

determining, by the delivery person computing device, that the package associated with the tag belongs with the group of packages to be delivered to the customer delivery address based at least in part on the tag being within a predetermined distance from the delivery person computing device and a second unique group identification code associated with the customer delivery address; and displaying, by the delivery person computing device, a notification message that the package belongs with the group of packages to be delivered to the customer delivery address.

2. The computer-implemented method of claim 1, further comprising:
receiving the radio signal from the tag at an interval that is dependent upon a distance between the package and the customer delivery address, wherein the interval decreases as the distance between the package and the customer delivery address decreases.

3. The computer-implemented method of claim 1, further comprising:
determining, by the delivery person computing device, the customer delivery address;
retrieving, by the delivery person computing device, the second unique group identification code associated with the customer delivery address from a table stored in a storage element associated with the delivery person computing device;
determining, by the delivery person computing device, that the estimated distance is less than or equal to the predetermined distance; and
determining, by the delivery person computing device, that the first unique group identification code received from the tag matches the second unique group identification code retrieved from the table.

4. The computer-implemented method of claim 1, further comprising:
transmitting over a wide area network, from the delivery person computing device to a delivery management system server, the tracking information and information associated with the signal strength of the radio signal; and
receiving over the wide area network, at the delivery person computing device from the delivery management system server, the estimated distance.

5. A computer-implemented method of managing a delivery of packages to a customer, the method comprising:
establishing a communication link between a tag and a computing device, wherein the tag is associated with a package, and wherein the package is included with a group of packages addressed to a customer delivery address;
receiving, by the computing device, tracking information comprising a package identification code and a first group identification code associated with the package;
receiving, by the computing device, coordinates of the tag;
determining, by the computing device, a location of the tag based at least in part on the coordinates of the tag;
determining, by the computing device, that the package associated with the tag belongs with the group of packages addressed to the customer delivery address based on the tag being within a predetermined area and a second group identification code associated with the customer delivery address; and
providing, by the computing device, a notification that the package belongs with the group of packages addressed to the customer delivery address.

6. The computer-implemented method of claim 5, further comprising:
receiving the tracking information from the tag at an interval that is dependent upon a distance between the package and the customer delivery address.

7. The computer-implemented method of claim 6, wherein the interval decreases as the distance between the package and the customer delivery address decreases.

8. The computer-implemented method of claim 5, further comprising:
determining, by the computing device, coordinates of a reference location;
retrieving, by the computing device, the second group identification code associated with the customer delivery address;
determining, by the computing device, an estimated distance between the tag and the reference location based on the coordinates of the tag and the coordinates of the reference location;
determining, by the computing device, that the estimated distance is within the predetermined area; and
determining, by the computing device, that the first group identification code associated with the package matches the second group identification code associated with the customer delivery address.

9. The computer-implemented method of claim 8, wherein the reference location is (i) a location of the computing device or (ii) the customer delivery address.

10. The computer-implemented method of claim 8, wherein the reference location is another package.

11. The computer-implemented method of claim 6, further comprising identifying, by the computing device, the package based at least in part on the package identification code and the second group identification code associated with the customer delivery address.

12. A computing device, comprising:
a storage element configured to store machine-readable instructions;
a communications interface; and
a processing element communicatively coupled to the storage element, wherein the processing element is configured to execute the machine-readable instructions to:
receive, via the communications interface, a radio signal from a tag attached to a package, the radio signal being representative of tracking information associated with the package, the tracking information comprising a package identification code associated with the package and a first group identification code associated with a package group to which the package is associated;
determine a signal strength of the radio signal;
determine an estimated distance to the tag based on the signal strength of the radio signal;
determine that the package associated with the tag belongs with a group of packages to be delivered to a customer delivery address based at least in part on the tag being within a predetermined area and a second group identification code associated with the customer delivery address; and
display, a notification message that the package belongs with the group of packages to be delivered to the customer delivery address.

13. The computing device of claim 12, wherein the processing element is further configured to execute the machine-readable instructions to:
receive the radio signal from the tag at an interval that is dependent upon a distance between the package and the customer delivery address, wherein the interval decreases as the distance between the package and the customer delivery address decreases.

14. The computing device of claim 12, wherein the processing element is further configured to execute the machine-readable instructions to:
   determine the customer delivery address;
   retrieve the second group identification code associated with the customer delivery address from a table stored in the storage element;
   determine that the estimated distance is within the predetermined area; and
   determine that the first group identification code received from the tag matches the second group identification code retrieved from the table.

15. The computing device of claim 12, wherein the processing element is further configured to execute the machine-readable instructions to:
   activate an indicator on the tag.

16. The computing device of claim 12, wherein the processing element is further configured to execute the machine-readable instructions to:
   transmit the tracking information and the signal strength associated with the tracking information to a system server; and
   receive the estimated distance from the system server.

17. The computing device of claim 12, wherein the processing element is further configured to execute the machine-readable instructions to:
   identify the package associated with the tag based at least in part on the package identification code and the second group identification code associated with the customer delivery address.

18. The computing device of claim 12, further comprising:
   a receiver signal strength indicator module to determine the estimated distance between the tag and the computing device.

19. The computing device of claim 12, further comprising:
   an analytics engine to determine the estimated distance between the tag and the computing device based at least in part on coordinates of the tag and coordinates of the computing device.

20. The computing device of claim 12, wherein the communication interface is a short range communication interface or a wide area network communication interface.

21. The method of claim 5, further comprising:
   determining a radius r and a reference location of the computing device;
   determining the predetermined area based on the radius r and the reference location;
   establishing a communication link between a second tag and the computing device, wherein the second tag is associated with a second package;
   determining that the second package is located within the predetermined area;
   determining that a third group identification code associated with the second package does not match the second group identification code; and
   providing, by the computing device, a notification that the second package does not belong with the group of packages addressed to the customer delivery address.

* * * * *